(12) United States Patent
Klinger et al.

(10) Patent No.: US 6,905,143 B2
(45) Date of Patent: Jun. 14, 2005

(54) FLUID CONDUIT QUICK CONNECTOR AND STUFFER PACK

(75) Inventors: Gary O. Klinger, Sylvan Lake, MI (US); Michael J. Andre, Waterford, MI (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/104,405

(22) Filed: Mar. 22, 2002

(65) Prior Publication Data

US 2003/0178844 A1 Sep. 25, 2003

(51) Int. Cl.$^7$ .............................................. F16L 27/00
(52) U.S. Cl. ...................... 285/140.1; 285/305; 285/86; 285/319
(58) Field of Search ................................ 285/136.1, 81, 285/203, 204, 141.1, 210, 86, 140.1, 308, 319, 305, 921

(56) References Cited

U.S. PATENT DOCUMENTS

| | | | |
|---|---|---|---|
| 4,436,125 A | | 3/1984 | Blenkush |
| 4,613,112 A | | 9/1986 | Phlipot et al. |
| 4,630,848 A | | 12/1986 | Twist et al. |
| 4,800,925 A | | 1/1989 | Yeoman |
| 4,834,719 A | | 5/1989 | Arenas |
| 5,201,552 A | | 4/1993 | Hohmann et al. |
| 5,273,254 A | | 12/1993 | McNaughton et al. |
| 5,285,807 A | | 2/1994 | Nitzberg |
| 5,354,103 A | | 10/1994 | Torrence et al. |
| 5,544,858 A | | 8/1996 | Rogers et al. |
| 5,609,370 A | * | 3/1997 | Szabo et al. ................. 285/319 |
| 5,711,508 A | | 1/1998 | Schreiber et al. |
| 5,823,508 A | | 10/1998 | Nie |
| 5,931,510 A | | 8/1999 | Mathew et al. |
| 5,951,059 A | | 9/1999 | Kitamura |
| 5,951,063 A | * | 9/1999 | Szabo ......................... 285/303 |
| 6,053,537 A | | 4/2000 | Guest |
| 6,155,612 A | * | 12/2000 | Szabo ......................... 285/319 |
| 6,173,999 B1 | | 1/2001 | Guest |
| 6,176,263 B1 | | 1/2001 | Lacroix et al. |
| 6,183,022 B1 | | 2/2001 | Guest |
| 6,220,570 B1 | | 4/2001 | Heinrichs et al. |
| 6,328,344 B1 | * | 12/2001 | Tozaki et al. .................. 285/93 |
| 2001/0048225 A1 | * | 12/2001 | Andre et al. ................. 285/305 |

FOREIGN PATENT DOCUMENTS

| | | | | |
|---|---|---|---|---|
| DE | 8215962 | | 10/1982 | |
| DE | 3311555 A1 | | 4/1984 | |
| FR | 2266091 | * | 10/1975 | ................. 285/305 |
| WO | WO 89/09361 | * | 10/1989 | ................. 285/319 |
| WO | WO 98/48209 | | 10/1998 | |

OTHER PUBLICATIONS

Written Opinion dated Mar. 30, 2004 based on PCT/US03/06487.

* cited by examiner

*Primary Examiner*—Aaron Dunwoody
(74) *Attorney, Agent, or Firm*—Young & Basile, P.C.

(57) ABSTRACT

A fluid quick connector adapted to be releasably mounted in a bore in a fluid use component. The quick connector includes a housing having a through bore releasably receiving a tubular endform. A retainer is mountable in the housing to latch the endform in the housing. A latch member carried on the housing is releasably engageable with a complementary latch receiver in the fluid use component. In one aspect, a latch member is carried on the end of at least one arm extending from the housing. Seal members are mountable in the bore in the fluid use component and retained in place by a top hat mountable in the quick connector housing. The top hat maintains the latch member in engagement with the latch receiver an the fluid use component.

6 Claims, 3 Drawing Sheets

FLUID CONDUIT QUICK CONNECTOR AND STUFFER PACK

BACKGROUND

The present invention relates, in general, to fluid quick connectors which fluidically couple two connector components.

Air flow conduits found in automotive vehicles typically are flexible and attached to flow control devices, such as solenoid valves, air compressors, etc. by means of various connectors. One such connector is a Legris type connector having fingers with flexible ends which grab the end of the flexible conduit.

However, this type of connector is susceptible to widely varying component manufacturing tolerances which cause the insertion force to vary between extremely high and low magnitudes. In addition, there is no indication of a fully, sealed connection between the conduit and the connector.

Since the conduits, connectors and air operated devices are typically made by different manufacturers, problems can be encountered due to allowable dimensional tolerance buildup between the various parts. An extreme tolerance buildup could create a "no build" situation.

Snap-fit or quick connectors are employed in a wide range of applications, particularly, for joining fluid carrying conduits in automotive and industrial application. Such quick connectors utilize retainers or locking elements for securing a male connector component, such as a tubular conduit, within a complimentary bore of a female connector component or housing. Such retainers are typically of either the axially-displaceable or radially-displaceable type. The terms "axially-displaceable" or "radially-displaceable" are taken relative to the axial bore through the female component.

In a typical quick connector with an axially-displaceable, retainer, the retainer is mounted within a bore in a housing of one connector component. The retainer has a plurality of radially and angularly extending legs which extend inwardly toward the axial center line of the bore in the housing. A tube or male component to be sealingly mounted in the bore in the one component includes a radially upset portion or flange which abuts an inner peripheral surface of the retainer legs. Seal and spacer members as well as a bearing or top hat are typically mounted in the bore ahead of the retainer to form a seal between the housing and the second component when the second component is lockingly engaged with the retainer legs in the housing.

Radially-displaceable retainers are also known in which the retainer is radially-displaceable through aligned bores or apertures formed transversely to the main throughbore in one component housing. The radially-displaceable retainer is typically provided with a pair of depending legs which are sized and positioned to slip behind the radially upset portion or flange on the conduit only when the or conduit is fully seated in the bore in the one component. This ensures a positive locking engagement of the conduit with the one component as well as providing an indication that the conduit is fully seated since the radially-displaceable retainer can be fully inserted into the one component only when the conduit has been fully inserted into the bore in the one component.

Thus, it would be desirable to provide a fluid quick connector which overcomes the problems encountered with previously devised fluid conduit connectors. It would also be desirable to provide a fluid flow quick connector which has a low insertion force, provides an indication of a fully sealed connection between the connector and the fluid flow conduit, as well as a fluid quick connector which minimizes dimensional tolerance buildup which could create a "no build" situation.

SUMMARY OF THE INVENTION

The present invention is fluid flow conduit quick connector which is releasably mountable in a bore in a fluid use device to fluidically couple a tubular member having an endform to the bore in the fluid use device.

In one aspect, the fluid quick connector includes a housing having a through bore extending between opposed ends. A retainer is mountable in the housing for latching an endform in the housing. Means are provided for latching the body in the bore in the fluid use component.

In another aspect the fluid quick connector is part of a fluid quick connect assembly. The fluid quick connect assembly includes a fluid use component having at least one bore extending from an open end. A latch receiver is formed in the bore. A quick connect housing having a through bore for receiving one end of an endform. Latch means are carried on the housing for engagement with the latch receiver in the bore in the fluid use component to mount the housing in the bore. A retainer is moveably mounted in the housing and adapted for securing the endform in the housing after the endform has been inserted through the bore in the housing.

The fluid quick connector of the present invention overcomes many deficiencies found in previously devised fluid quick connectors, typically quick connectors used to connect air lines to fluid use devices, such as pumps, manifolds, valves, etc. The quick connector housing which is releasable mountable in the bore in the fluid use device and which receives a endform mounting retainer avoids the undesirable dimensional build-up tolerances which may lead to a "no build" situation with certain previously devised fluid quick connectors. The fluid quick connector of the present invention is also mountable to different housing and bodies.

The quick connector of the present invention also provides a fully sealed, secure connection between a flexible air flow conduit and an air flow control device; while at the same time providing low insertion force, high pull out force and an indication of a fully sealed connection.

BRIEF DESCRIPTION OF THE DRAWINGS

The various features, advantages and other uses of the present invention will become more apparent by referring to the following detailed description and drawing in which.

DETAILED DESCRIPTION

Figure 1:
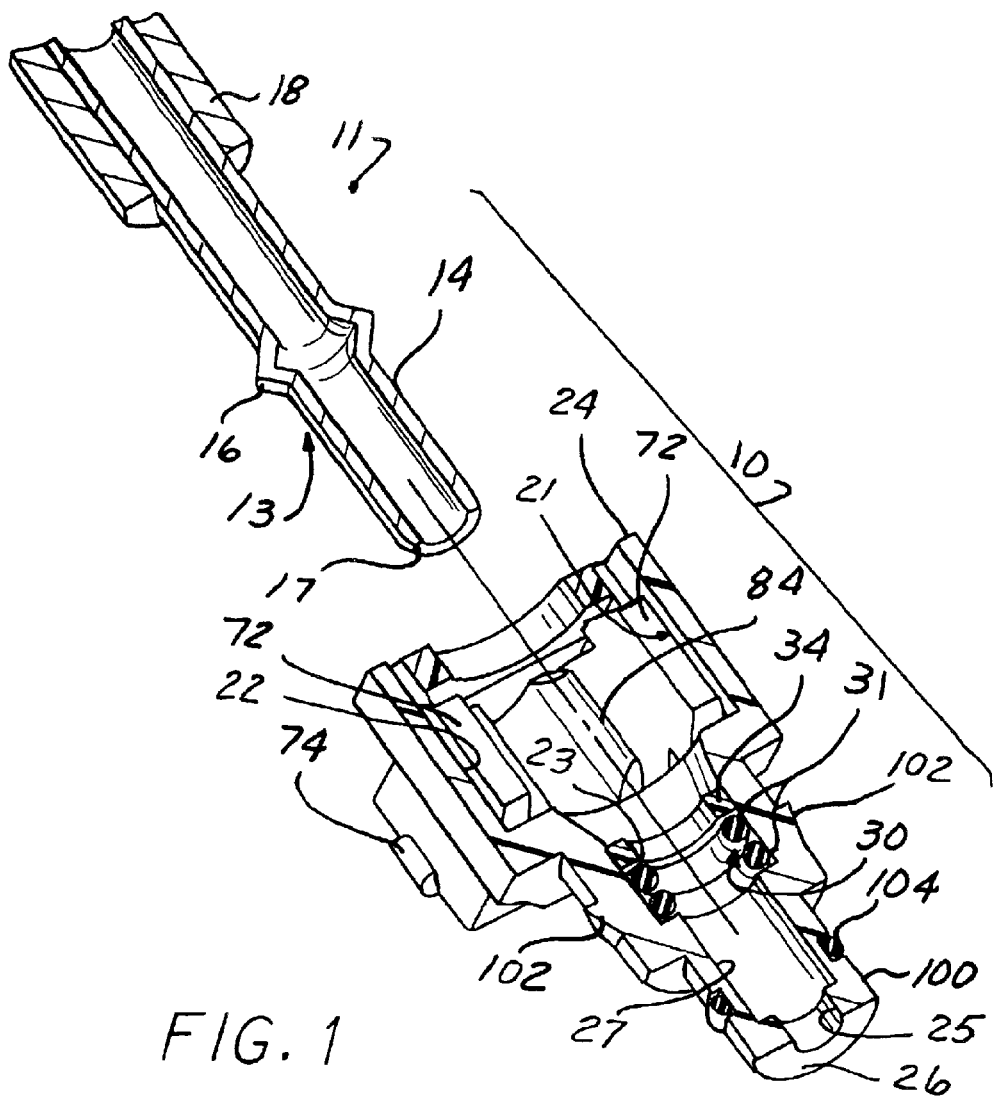
FIG. 1 is an exploded, perspective, longitudinally cross-sectioned view of the fluid quick connector of the present invention used to connect a fluid conduit to a fluid flow control device.

Referring now to the drawing, and to FIGS. 1–6 in particular, there is depicted fluid quick connector 10 of the present invention. The quick connector 10 is ideally suited for sealingly connecting a conduit 11, to an fluid flow use or control device 13, such as a valve, air compressor, etc., depicted in FIGS. 1 and 6 as a tubular sleeve or endform.

The conduit 11 includes an inner tube 14, formed of metal or plastic, such as nylon, by way of example only. An annular flange 16 of an enlarged diameter is formed in the endform 13 of the inner tube 14 spaced from an end 17 of the inner tube 14.

Figure 2:
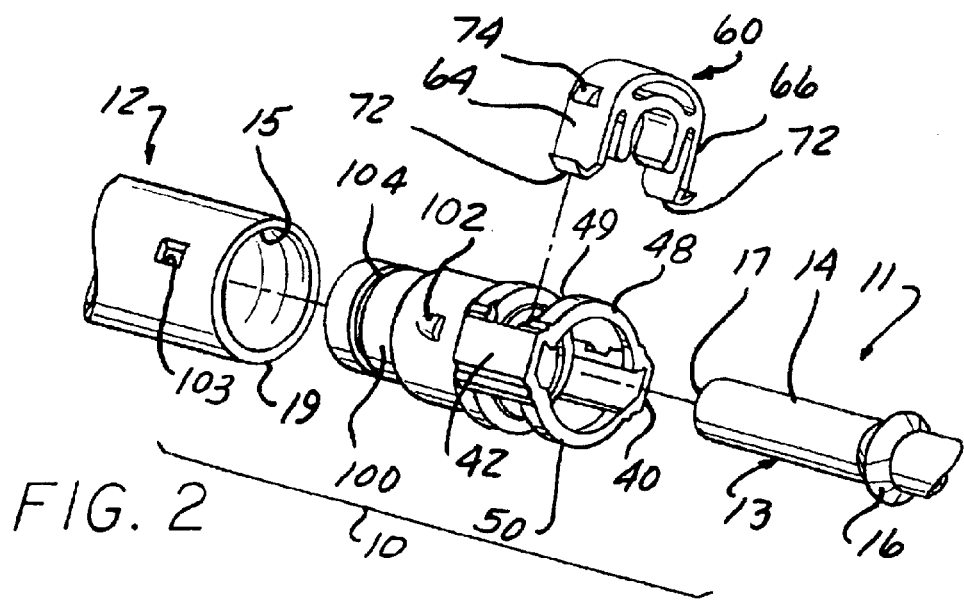
FIG. 2 is a perspective view of the quick connector to the present invention.

An outer tube or sheath 18 is mounted over substantially the entire length of the inner tube 14. The outer tube or sheath 18 prevents permeation of exterior contaminants into the inner tube 14. In the present application, an end portion of the outer tube 18 is stripped back or cut away exposing the endform 13 as shown in FIGS. 1 and 2.

The following description of the use of the fluid quick connector 10, a tubular conduit 11 having a tip end 17 and a raised annular bead or flange 16 spaced from the tip end 17 will be understood to apply to the connection of any type of conduit, hose, and/or solid metal or plastic tube. The end of a conduit or tubular member inserted into the interior of one end of the quick connector will be defined as an endform. The endform can be a separate member which receives a separate hose or conduit at one end or a shape integrally formed on the end of an elongated metal or plastic tube. Further, the endform can be integrally formed on or mounted as a separate element to a fluid charged or pressurized use device, such as a pump, filter, etc., rather than as part of an elongated conduit.

Figure 6:
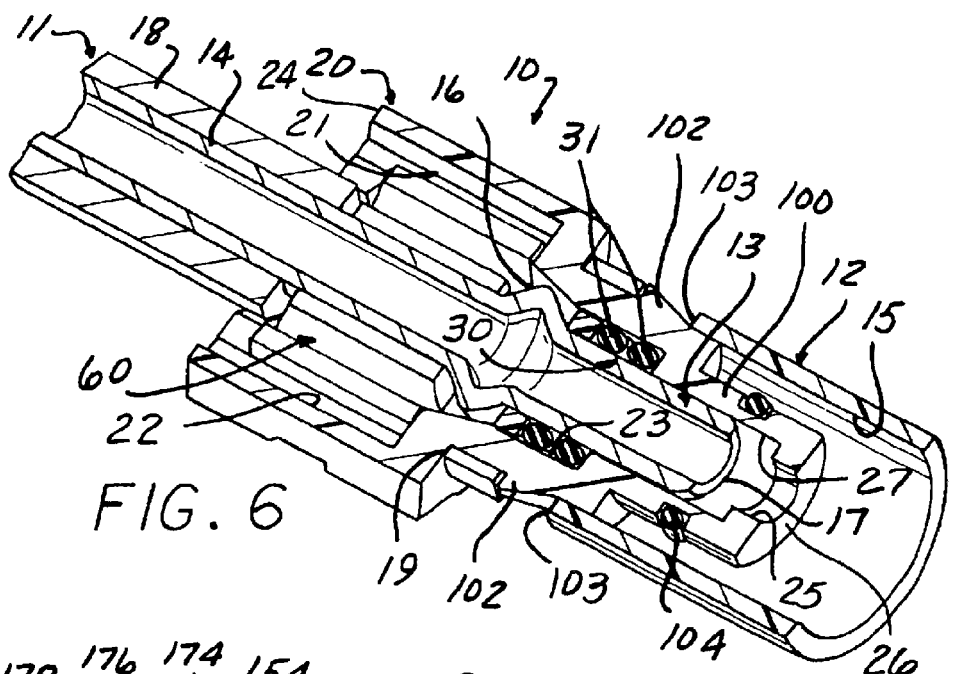
FIG. 6 is a perspective, longitudinal, cross-sectional view of the assembled quick connector, conduit and retainer shown in FIGS. 1–5.

FIG. 6 shows the fluid use element or housing 12 by way of example only as being in the form of a tubular or cylindrical member. It will be understood that the tubular shape is depicted by example only, as the use device 12 may also form part of the fluid use device itself, such as a pump, a filter, manifold, etc.

By way of example only, the use device 12 includes a through bore 15 extending from a first outer end 19 to an opposed end, not shown, which has a port or flow bore extending therethrough in fluid communication with the through bore 15. At least one and preferably two latch apertures 108 are formed in the wall of the use device 12 surrounding the bore 15, the purpose of which will be described in greater detail hereafter.

The quick connector 10 includes a housing 20 having an elongated, axially-extending, internal stepped bore 21, shown in detail in FIGS. 1, 2 and 6, extending from a large diameter first, open end 24 to a smaller diameter, second open end 26. The stepped bore 21 includes a first bore portion 22 extending from an opening at the first end 24 of the housing 20 to a second smaller diameter second stepped bore portion 23. A third yet smaller diameter stepped bore portion 27 extends axially from one end of the second stepped bore portion 23 and communicates to a still smaller fourth stepped bore portion 25 which extends to the second end 26 of the housing 20.

As is conventional, a top hat or bearing 34 is mounted in the second stepped bore portion 23 immediately adjacent the end of the first bore portion 22. A seal means 30 is also mounted in the second stepped bore portion 23 between one end of the top hat 34 and the third stepped bore portion 27. The seal means 30 is formed, by example, of at least one and preferably two O-rings 31 which may be separated by a rigid, annular spacer, not shown.

The inner diameter of the first stepped bore portion 22 is sized to slidably receive the outer diameter of the radially-enlarged flange or upset bead 16 formed on the endform 13. Further, the inner diameters of the seal means 30 and the top hat 34 are sized to sealingly engage the outer diameter of the end portion of the endform 13 extending from the radially-enlarged flange 16 to the tip end 17 of the endform 13. The second stepped bore portion 22 has an inner diameter sized to snugly engage the outer diameter of the end portion of the endform 13 when the endform 13 is fully inserted into the stepped bore 21 as described hereafter.

Figure 4:
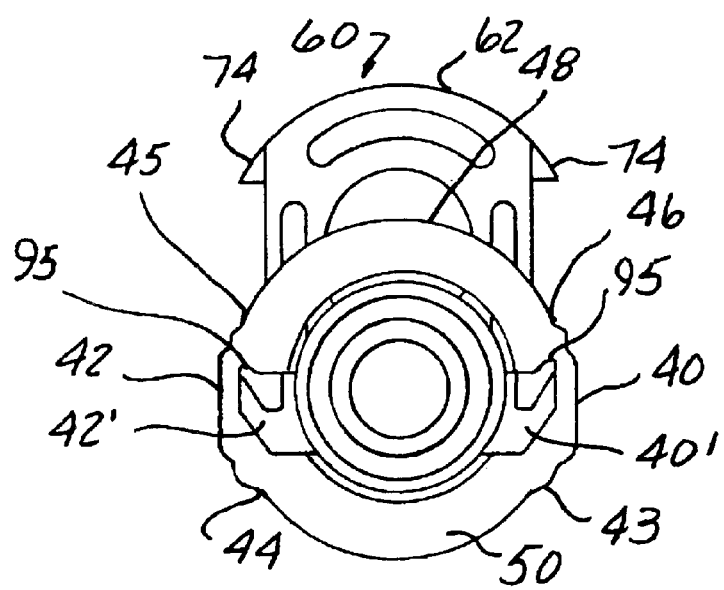
FIG. 4 is an end view of the quick connector and retainer shown in FIGS. 1 and 2, with the retainer shown in a partially inserted, storage position.
Figure 5:
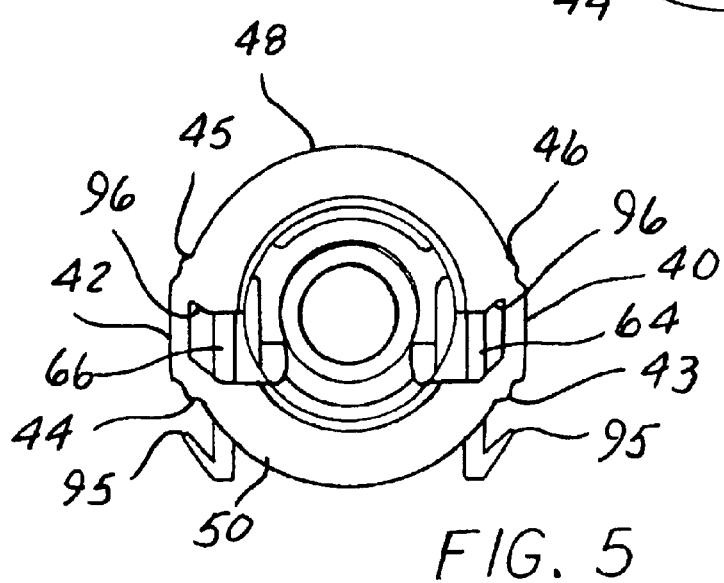
FIG. 5 is an end view of the quick connector and retainer shown in FIGS. 1 and 2, with the retainer depicted in a fully inserted, position in the female component.

As shown in FIGS. 2, 4, and 5, the first end 24 of the housing 20 is formed with a pair of opposed, exterior flat surfaces 40 and 42. The flat surfaces 40 and 42 are diametrically opposed on the first end 24 and may be centrally located on each diametrical side of the first end 24. The adjacent surfaces of the housing 20 to one side of the flat surfaces 40 and 42 form an opposed pair of lock surfaces or flats, such as a first flat 43 and a second flat 44. A second pair of flats 45 and 46 are formed on the housing 20 the other side of the flat surfaces 40 and 42. The flats 43 and 44 extend axially a short distance from the first end 24 of the housing 20. Opposed surfaces 48 and 50 of the first end 24 of the housing 20 between the flats 43 and 44 and the flats 45 and 46 have a generally arcuate shape as shown in FIGS. 4 and 5. Apertures 49 and 51 are formed respectively in each surface 48 and 50. The apertures 49 and 51 are aligned to form a transverse bore extending through the first end 24 of the housing 20 which is disposed in communication with the first bore portion 21 in the housing 20.

A retainer 60, described hereafter, is by way of example only as other radially-displaceable retainer designs having side locking projections may also employ the release tool of the present invention. Alternately, the housing 20 can be reconfigured to receive an axial-type retainer.

The retainer 60 is formed of a one-piece body of a suitable plastic, such as polyphthalamide, for example, and has an end wall 62 formed of a generally curved or arcuate shape, again by way of example only, and first and second spaced side legs 64 and 66. The side legs 64 and 66 extend generally parallel to each other from opposite ends of the end wall 62. Further, each side leg 64 and 66 has an outer end 72, although it is also possible to connect the side legs 64 and 66 at a lower portion by an arcuate member.

A pair of projections 70 extend along the length of the retainer 60 between opposed side edges of the side legs 64 and 66, respectively. The projections 70 are located adjacent the outer end 72 of each leg 64 and 66. The projections 70 engage surfaces on the housing 20 to position the retainer 60 in the shipping position shown in FIG. 4, or in the fully inserted, latched position shown in FIG. 5.

Further, a pair of outward extending lock tabs or edges 74 are formed adjacent the end wall 62 on each side leg 64 and 66 and engage notches in the edges of the flats 40 and 42.

As shown in FIGS. 2–5, the retainer 60 includes a radially flanged receiving means 80 which is preferably carried as an integral, one-piece part of the retainer 60. The radial flange receiving means 80 includes first and second depending arms 82 and 84 which extend from a boss or enlargement 86 integrally formed on the inner surface of the end wall 62 of the retainer 60. An inverted, U-shaped slot 88 is formed on the inner surfaces of the arms 82 and 84 and the boss 86 which is sized to snugly conform to the outer diameter of the tubular portion of the endform 13. The outer ends 91 of each of the arms 82 and 84 are angled or tapered to act as a guide surface to assist in sliding movement of the arms 82 and 84 over the tubular end of the endform 13.

Figure 3:
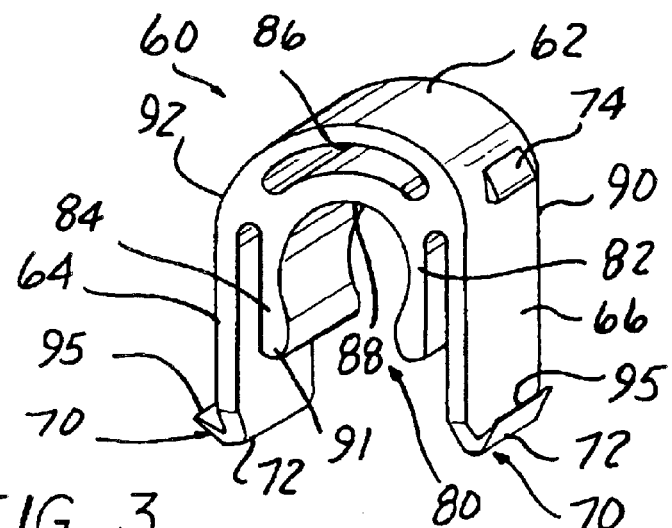
FIG. 3 is an enlarged, left end, perspective view of the retainer shown in FIGS. 1 and 2.

As shown in FIG. 3, each of the arms 82 and 84 extends from one side end contiguous with a first side end 90 of the retainer 60 to an opposed side end contiguous with a second side end 92 of the retainer 60.

As shown in FIGS. 2–5, the projections 70 on the legs 64 and 66 of the retainer 60 are formed with an angled hook-like shape terminating in a tip 95. The tip 95 is disposed at an acute, upturned angle with respect to the corresponding legs 64 and 66.

Similarly, as shown in FIGS. 4 and 5, the grooves 40' and 42' are formed in the interior of the flat surfaces 40 and 42, respectively, and include a recess or notch 96 at one end which is shaped complimentary to the shape of the tip 95 of the projection 70 on each of the legs 64 and 66 of the retainer 60. In this manner, pull out of the retainer 60 from the housing 20 is resisted by the interlocking tips 95 on the legs 64 and 66 of the retainer 60 which are seated within the notches 96 in the grooves 40' and 42' in the housing 20 as shown in the partially inserted, shipping position of the retainer 60 in FIG. 4. The flats or lock edges 44 and 46 are disposed at an angle complimentary to the acute angle of the tips 95 on the legs 64 and 66 of the retainer 60. This enables interlock of the tips 95 with the flats 44 and 46 resists pull out of the retainer 60 from the housing 20 from the fully latched position shown in FIG. 5.

The hook shaped tips 95 on the legs 64 and 66 of the retainer 60 in conjunction with the grooves 40' and 42' in the housing 20 also provide, a distinct, "avalanche effect" snap action of the retainer 60 in the housing 20. The grooves 40' and 42' in the housing 20 are formed in generally planar flat surfaces. The inner surfaces force the ends 72 of the legs 64 and 66 laterally inward toward each other when the retainer 60 is inserted into the housing 20. When the tips 95 clear one edge of the grooves 40' and 42', the resilient nature of the legs 64 and 66 snaps the ends 72 and the tips 95 laterally outward to create an "avalanche effect" which provides a distinct tactile feedback to the user indicating that the retainer 60 has lockingly engaged the housing 20 in either the partially inserted position shown in FIG. 4 or the fully inserted position shown in FIG. 5.

It should be noted that further insertion force on the retainer 60 moving the retainer 60 from the partially inserted position shown in FIG. 4 to the fully inserted position shown in FIG. 5 again causes the end 72 of the legs 64 and 66 to be urged laterally inward when the tips 95 of the legs 64 and 66 slide along the lower portion of the inner surfaces of the flats 40 and 42. When the tips 95 clear the outer end of the inner surfaces, the legs 64 and 66 spring laterally outward in a distinct "avalanche effect" manner. The lower ends of the grooves 40' and 42' are angled to enable the tips 95 to slide out of the grooves 40' and 42' toward the fully latched position.

The retainer 60 can be first be installed on the housing 20 in a shipping or storage position as shown in FIGS. 1 and 4. In this position, the projections 70 on the side legs 64 and 66 of the retainer 60 snap into and engage the longitudinally extending grooves 40' and 42'.

Further insertion of the retainer 60 through the aligned apertures 49 and 51 in the housing 20 causes the ends 72 of the legs 64 and 66 to pass along the lower portion of the inner surfaces of the flat surfaces 40 and 42 until the tips 95 clear the ends of the surfaces and then snap outward exteriorly of the outer surface of the first end 24 of the housing 20 as shown in FIG. 5. In this fully inserted position of the endform 13 in the housing 20, the annular flange 16 on the endform 13 is situated ahead the arms 82 and 84 of the retainer 60. This position represents the fully latched position in which the endform 13 is fully seated in and lockingly engaged with the housing 20. The full insertion of the retainer 60 into the housing 20 also provides visible indication of the fully locked connection of the endform 13 to the housing 20, respectively.

It should be noted that if the endform 13 is not fully engaged or seated within the housing 20, the annular flange 16 on the endform 13 will not be properly situated within the transverse bore in the housing 20 to slidably receive the arms 82 and 84 in the retainer 60. If the annular flange 16 on the endform 13 is at any position other than that shown in FIG. 6, the arms 82 and 84 on the retainer 60 will contact the annular flange 16 on the endform 13. Since the spacing between the inner surfaces of the legs 82 and 84 is less than the outer diameter of the annular flange 16, the retainer 60 cannot be moved to the fully inserted position thereby providing an indication of an incomplete seating or mounting of the end portion of the endform 13 in the housing 20.

According to the present invention, the quick connector 10 is configured for a latching mounting in the use element 12. As described above, the use element 12 is depicted merely as a pictorial representation of a cylindrical member having a bore 15 extending there through. The use element 12 can also be formed as a bore in a use element, such as a valve, manifold, pump, etc. At least one and preferably a pair of apertures 21 are formed in the use element 12. Alternately, the projections 21 can be formed as an annular continuous or discontinuous groove which opens to the bore 15 extending from the outer end 19 into the use element.

The housing 20 of the quick connector 10 has an axial extension 100 which extends axially from the seals 30. At least one and, preferably, a pair of outwardly extending latch fingers or projections 102 project from the axial extension 100 and are configured for snap in, latching engagement with the apertures 21 in the bore 15 of the use element 12. The latch projections 102 enable the entire housing 20 of the quick connector 10 to be snap-fitted into the use element 12.

An optional seal, such as at least one O-ring 104, is mounted in an annular groove in the extension 100 for sealingly engaging an inner surface of the bore 15 and the use element 12 when the bore 15 is configured with the diameter closely approximating the outer diameter of the axial extension 100 of the quick connector housing 20.

In use, the quick connector housing 20 can be premounted by means of the latch projection 102 in the use element 12. The endform 13 may then be inserted into the bore 21 in the housing 20 and the retainer 60 moved from the temporary storage position shown in FIG. 4 to the fully latched position shown in FIGS. 1, 5 and 6 latching the endform 13 and the entire conduit 11 in the quick connector housing 20 in fluid communication with the bore 15 leading into the use element 12.

Alternately, the endform 13 may be premounted in the housing 20 of the quick connector 10. After the retainer 60 has been moved to the fully latched position shown in FIG. 5, thereby locking the endform 13 in the housing 20, the entire housing 20 and the endform 13 can be inserted into the bore 15 in the use element 12 wherein the housing 20 is latched to the use element 12 via the projections 102 and the apertures 21.

Figure 7:
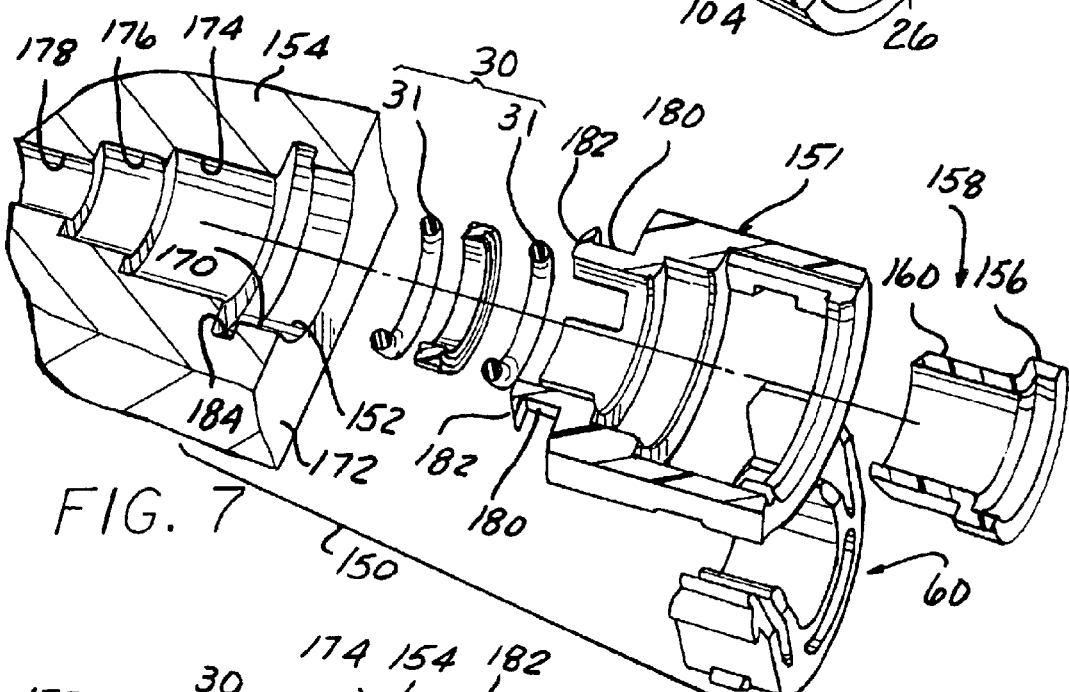
FIG. 7 is an exploded, perspective view of another aspect of a quick connector according to the present invention shown in a disassembled state.
Figure 8:
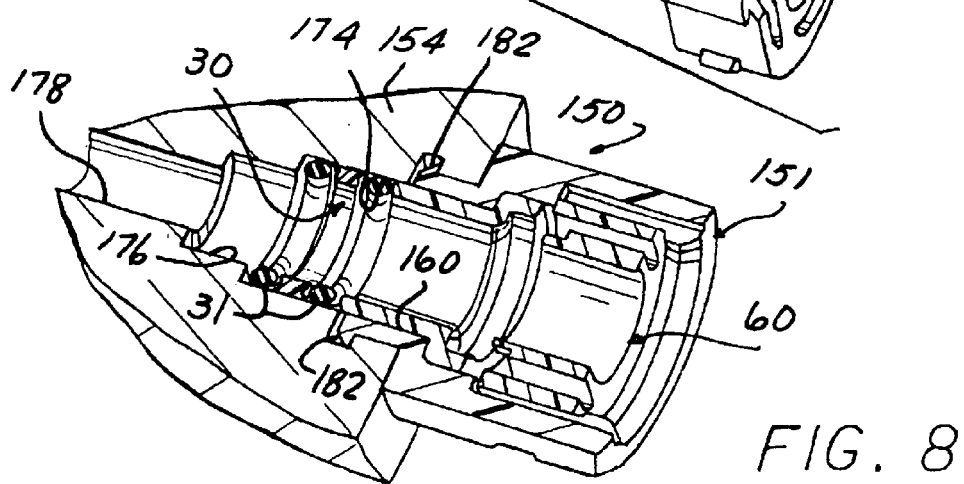
FIG. 8 is a perspective, longitudinal cross-section view of the quick connector shown in FIG. 7, depicted in an assembled state on a fluid use element.

Referring now to FIGS. 7 and 8, there is depicted another aspect of a quick connector 150 according to the present invention in which the quick connector 150 is configured for pre-mounting in the form of a stuffer pack in a bore 152 in a use element 154, prior to receiving an endform, such as endform 13 on a tubular conduit 11 in a sealed latched position to dispose the conduit 11 in fluid flow communication with the bore 152 in the use element 154.

The quick connector 150 is constructed in essentially the same manner as the quick connector 10 described above in that it has an end configuration adapted for transversely receiving the retainer 60 which is identical to the retainer 60 in FIGS. 1–6. Further details concerning the end configuration of the quick connector 150 will not be described herein as such features are the same as the corresponding structure in the quick connector 10 shown in FIGS. 1–6.

However, in this aspect of the quick connector 150, the second bore portion 23 is axially-enlarged to receive an enlarged annular end 156 of a top hat 158. The remaining portion 160 of the top hat 158 has a diameter to slidably extend through the third stepped bore portion 24 in the housing 151 of the quick connector 150.

In this aspect, the bore 152 and the use element 150 is provided with a stepped configuration having a first bore portion 170 extending from the outer end 172 of the use element 154, an adjacent smaller, second diameter bore portion 174, a third bore portion 176 and an optional fourth bore portion 178 of even smaller diameter both extending axially from the second bore portion 174.

The second bore portion 174 is configured for premountingly receiving the seal means, such as one or more O-ring seals and an intervening spacer 31 which are inserted into and seated within the second bore portion 174 as shown in FIG. 8.

The housing 151 of the quick connector 150 is provided with at least one and preferably a plurality of circumferentially spaced legs or arms 180, with three of the four equally spaced arms 180 being depicted in FIG. 7. Each arm 180 is spaced by a slot from an adjacent arm 180. Further, each arm 180 terminates in a radially outwardly extending hook or projection 182. The projection 182 is releasably engageable with a latch receiver 184 formed as a plurality of coplanar recesses or as a continuous annular groove 184 in the bore 152 in the use element 154 between the first bore portion 170 and the second bore portion 174.

As shown in FIG. 8, after the seals 30 and the spacer 31 have been premounted in the second bore portion 174, the quick connector housing 150 is inserted through the first bore portion 170 of the use element 154. The arms 180 have sufficient flexibility so as to be able to bend radially inward to allow the projections 182 to clear the smaller diameter first bore portion 170. When the housing 151 has been inserted a sufficient distance into the bore 152 in the use element 154, the projections 182 will snap radially outward into the projection or latch receivers 184 latching the quick connector housing 151 to the use element 150.

The retainer 60 can be then mounted in the quick connector housing 151 by transverse movement to the storage position shown in FIG. 4 or premounted in the quick connector housing 151 before the quick connector housing 151 is inserted into the bore 152 in the use element 154, as described above. Regardless, after the quick connector housing 151 is mounted in the bore 152 and the retainer 60 is situated in the temporary storage position shown in FIG. 4, the top hat 158 is then inserted through the open end of the quick connector housing 151 into a fully seated position in the stepped bore portions of the quick connector housing 151. In this position, the top hat 158 axially retains the O-rings 31 and a spacer in the bore portion 174 of the use element 154. Further, since the top hat 158 is formed of a rigid material, such as nylon or other suitable plastic, the end portion 160 of the top hat 158 is situated radially inward of the projections 182 on the arms 180 of the quick connector housing 151. This enables the top hat 158 to retain the projections 182 in a radially outward engagement with the latch receiver 184.

The endform 13 of a conduit 11 can then be inserted through the open end of the quick connector housing 151 into fall engagement with the seals 31. Only when the endform 13 has been fully inserted into engagement with the seals 31 can the retainer 60 be moved from the temporary storage position shown in FIG. 4 to the fully latched position shown in FIG. 5.

Reverse movement of the retainer 60 back to the storage position shown in FIG. 4 or completely from the quick connector housing 151 will enable the endform 13 of the conduit 11 to be separated from the quick connector 150 and the use element 154.

In summary, there has been disclosed a unique quick connector for mounting as a stuffer pack in a bore in a use element. The quick connector also is latchable in the use element bore.

What is claimed is:

1. A fluid quick connector assembly comprising:
a fluid use component having at least one bore extending from an open end;
seal means, disposed in the bore in the housing, for sealing an endform in the housing;
a latch receiver formed in the bore;
a quick connect housing having a through bore for receiving one end of a tubular member having an endform spaced from the one end;
latch means, carried on the housing, for engaging the latch receiver in the bore of the fluid use component to mount the housing in the bore; and
a retainer moveably mounted in the housing and adapted for securing the endform in the housing after the endform has been inserted through the bore in the housing;
the seal means including a top hat insertable into the quick connector housing, the top hat engagable with the latch means to maintain the latch means in a latch position in the latch receiver in the bore of the fluid use component.

2. The fluid quick connector assembly of claim 1 wherein the latch receiver comprises:
an annular groove formed in the fluid use component opening to the bore in the fluid use component.

3. The fluid quick connector assembly of claim 1 wherein the latch means comprises:
a latch member carried on the quick connector housing adapted for releasable engagement with the latch receiver in the fluid use component.

4. The fluid quick connector assembly of claim 1 wherein the latch means comprises:
at least one arm extending from the housing, a latch projection carried on the arm releasably engageable with the latch receiver.

5. The fluid quick connector assembly of claim 4 further comprising:
a plurality of circumferentially spaced arms carried on the quick connector housing, each arm carrying a latch projection.

6. A fluid quick connector assembly comprising:

a fluid use component having at least one bore extending from an open end;

seal means, disposed in the bore in the housing, for sealing an endform in the housing;

a latch receiver formed in the bore;

a quick connect housing having a through bore for receiving one end of a tubular member having an endform spaced from the one end;

a latch member carried on the quick connector housing adapted for releasable engagement with the latch receiver in the fluid use component; and a retainer moveably mounted in the housing and adapted for securing the endform in the housing after the endform has been inserted through the bore in the housing;

the seal means including a top hat insertable through the bore in the quick connect housing, the top hat engagable with the latch member on the housing to maintain the latch member on the at least one arm in engagement with the latch receiver in the fluid use component.

* * * * *